United States Patent Office 3,249,598
Patented May 3, 1966

---

3,249,598
MONOAZO AND DISAZO COMPOUNDS WITH AN ACTIVE METHYLENE COUPLING COMPONENT
Paul Resnick, Brooklyn, N.Y., and Hsien Cheng Yao, Dearborn, Mich., assignors to Interchemical Corporation, New York, N.Y., a corporation of Ohio
No Drawing. Filed June 28, 1962, Ser. No. 205,873
5 Claims. (Cl. 260—176)

This invention relates to azo compounds having extremely facile acetyl cleavage.

The new compounds are of the type that can be represented by the formula $$\text{Ar}-\text{N}=\text{N}-\underset{\underset{R'}{|}}{\overset{\overset{R''}{|}}{\underset{C=O}{\overset{C=O}{C}}}}-R'$$

wherein Ar is an aromatic ring such as phenyl, diphenyl naphthyl, etc., R' is an alkoxy or amino group, and R or R'' is an alkyl group, an aryl group, or R and R'' complete a ring structure. They are unique in having a very facile acetyl cleavage and thus serve as sensitive mild acetylating agents. No other substance need be added to initiate or to carry out the acetylating reaction. They also may be used as polymerization initiators.

The new azo compounds may be prepared in excellent yields and with clean reactions. In the coupling reactions weak bases are used, such as pyridine, picolines, quinoline, collidine, etc. Cleavage reactions of the compounds with water, ethanol, phenol, aniline, and acetic acid were studied and showed that an acyl cleavage and an azo to hydrazone conversion were involved.

EXAMPLE 1

*α-Phenylazo-α-methyl-acetoacetic ethyl ester*

(A) 20 g. of alpha-methyl acetoacetic ethyl ester were dissolved in 200 ml. of a mixture of 50 ml. of pyridine and 150 ml. of water. The solution was cooled to 0° C.

(B) 13 g. of aniline were dissolved in 120 ml. of 5 N HCl and cooled to 0° C. A cooled saturated solution of sodium nitrite was slowly added with constant stirring until the equivalent of 10 g. of solid sodium nitrite had been added.

B was then added dropwise to A with constant stirring, the temperature of the mixture being maintained at 0° C. When the addition was complete a yellow oily layer was on the bottom. The ice-cooled solution was extracted with ether. The extract was washed with very dilute ice-cold acetic acid followed by washing with several portions of ice water. The ether solution was dried over magnesium sulfate and the ether subsequently evaporated under vacuum. 27 g. of the crude product, a yellow liquid, were obtained. Further purification was accomplished by vacuum distillation, the principal fraction coming over at 138–140° C. at 4 mm. of mercury. Some decomposition was observed. Analysis of the principal distillate showed C, 62.75%; H, 6.41%, and N, 11.17%. Theory required C, 62.80%; H, 6.46%, and N, 11.28%. The index of refraction was $N_D=1.51158$ at 22° C. The yield was 78% of the theoretical.

EXAMPLE 2

*α-Phenylazo-cyclopentanone-α-carboxylic acid ethyl ester*

Using the same procedure as in Example 1, phenyl diazonium chloride was coupled to cyclopentanone-α-carboxylic ethyl ester. A yield of 92% of the crude product was obtained after the evaporation of ether under vacuum. The index of refraction of the liquid product was $N_D^{22}=1.5477$ and analysis showed C, 64.38%; H, 6.28%; N, 10.86%. Theory requires C, 64.61%; H, 6.20%; N, 10.81%.

EXAMPLE 3

*α-Phenylazo-α-methyl-acetoacetanilide*

Again using the same procedure as in the preceding examples phenyl diazonium chloride was coupled to alpha-methyl-acetoacetanilide. The product was recrystallized from a mixture of benzene and petroleum ether. The melting point was 105–106° C. and the yield was 90%. Analysis showed C, 69.08%; H, 5.87%; N, 14.28%. Theory requires C, 69.14%; H, 5.80%; N, 14.23%.

EXAMPLE 4

*α-Phenylazo-cyclopentanone-α-carboxanilide*

Again by utilizing the same method as before phenyl diazonium chloride was coupled with cyclopentanone-α-carboxanilide. The product was recrystallized from a mixture of benzene and petroleum ether. The melting point was 104° C. and the yield was 90%. Analysis showed C, 70.24%; H, 5.53%; N, 13.60%. Theory requires C, 70.33%; H, 5.57%; N, 13.67%.

EXAMPLE 5

*Alpha-alpha'-bisphenyl-azo-alpha, alpha'-dimethyl-diacetoacetic acid diethyl ester*

The procedure for making this compound was similar to that used in Example 1. After the distillation of ether under vacuum, the crude product was further purified by recrystallization from petroleum ether (of boiling range 30°–60° C.). The purified product had a melting point of 81°–82° C. The yield was 85%. Analysis showed C, 61.18%; H, 6.11%; N, 11.84%. Calculated for $C_{26}H_{30}O_6$; C, 63.12%; H, 6.07%; N, 11.33%.

Formulas of the products found in the examples are:

(Example 1)

$$C_6H_5-N=N-\underset{\underset{O-C_2H_5}{|}}{\overset{\overset{CH_3}{|}}{\underset{C=O}{\overset{C=O}{C}}}}-CH_3$$

(Example 2)

$$C_6H_5-N=N-\underset{\underset{O-C_2H_5}{|}}{\overset{\overset{\overset{CH_2}{/\ \backslash}}{C=O\ \ CH_2}}{\underset{C=O}{\overset{|\ \ \ \ \ |}{C\text{------}CH_2}}}}$$

(Example 3)

$$C_6H_5-N=N-\underset{\underset{NHC_6H_5}{|}}{\overset{\overset{CH_3}{|}}{\underset{C=O}{\overset{C=O}{C}}}}-CH_3$$

(Example 4)

$$C_6H_5-N=N-\underset{\underset{NHC_6H_5}{|}}{\overset{\overset{\overset{CH_2}{/\ \backslash}}{C=O\ \ CH_2}}{\underset{C=O}{\overset{|\ \ \ \ \ |}{C\text{------}CH_2}}}}$$

(Example 5)

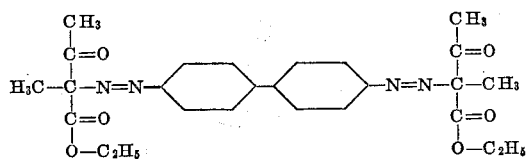

What is claimed is:
1. A phenylazo compound selected from the group consisting of α-phenylazo-cyclopentanone-α-carboxylic ethyl ester, α-phenylazo-α-methylacetoacetanilide, α-phenylazo-cyclopentanone-α-carboxanilide, and α,α'-bisphenylazo-α,α'-dimethyl-diacetoacetic acid diethyl ester.

2. α-Phenylazo-cyclopentanone-α-carboxylic ethyl ester.
3. α-Phenylazo-α-methyl-acetoacetanilide.
4. α-Phenylazo-cyclopentanone-α-carboxanilide.
5. α,α'-Bisphenlazo-α,α'-dimethyl-diacetoacetic acid diethyl ester.

References Cited by the Examiner

Favrell, G.: Bull. Soc. Chim. (4) 47 (1930), pp. 1290–1300.
Halzach, K.: "Die Aromatischen Diazoverbindungen," 1947, pp. 151–153.
Kalbu et al.: "Berichte," p. 1863, vol. 59 (1926).
Linstead et al.: "Chem. Soc. J. (London)," pt. 1, Jan.–June, pp. 807–814 (1937).

CHARLES B. PARKER, *Primary Examiner.*